United States Patent
Axenfeld

[15] 3,666,081
[45] May 30, 1972

[54] LAUNDRY CONVEYOR

[72] Inventor: Stanley E. Axenfeld, 1413 June Lane, Narberth, Pa. 19072

[22] Filed: Sept. 16, 1969

[21] Appl. No.: 858,324

[52] U.S. Cl..............................................198/43, 198/105
[51] Int. Cl......................................................B65g 47/00
[58] Field of Search...............198/43, 182, 75, 84, 105, 201, 198/204; 193/35, 35 A, 35 G; 214/16.42

[56] References Cited

UNITED STATES PATENTS

| | | | |
|---|---|---|---|
| 1,556,438 | 10/1925 | Hanson et al.........................198/20 T |
| 2,828,853 | 4/1958 | Hart......................................198/204 |
| 2,982,387 | 5/1961 | Hinckley................................193/35 |
| 3,353,652 | 11/1967 | Fellner..............................198/105 X |
| 2,096,958 | 10/1937 | Clerc.................................214/16.4 X |
| 2,564,056 | 8/1951 | Fahey.................................198/75 X |
| 2,726,753 | 12/1955 | Bee......................................198/84 |
| 3,110,388 | 11/1963 | Elliott et al. .............................198/43 |
| 3,220,527 | 11/1965 | Curtis...................................193/35 |
| 3,420,348 | 1/1969 | Caudell et al............................193/35 |

Primary Examiner—Richard E. Aegerter
Assistant Examiner—Douglas D. Watts
Attorney—Jacob Trachtman

[57] ABSTRACT

A conveyor for transferring pallets containing pieces of laundry from one location to another. The conveyor includes a frame which supports two sets of vertically spaced guide rails which extend between the ends of the frame. The upper set of guide rails extends downwardly from one end of the frame to the other end, and the lower set of guide rails extends downwardly from the other end of the frame to the one end. A set of driven conveyor belts is provided at the higher end of the upper set of guide rails. A pallet loaded with pieces of laundry is carried by the conveyor belts to the high end of the upper set of guide rails and then slides down the upper set of guide rails. The pallet is unloaded and the empty pallet is placed on the higher end of the lower set of guide rails. The pallet slides down the lower set of guide rails back to the one end of the conveyor where it can be reloaded with the pieces of laundry.

8 Claims, 4 Drawing Figures

Patented May 30, 1972
3,666,081
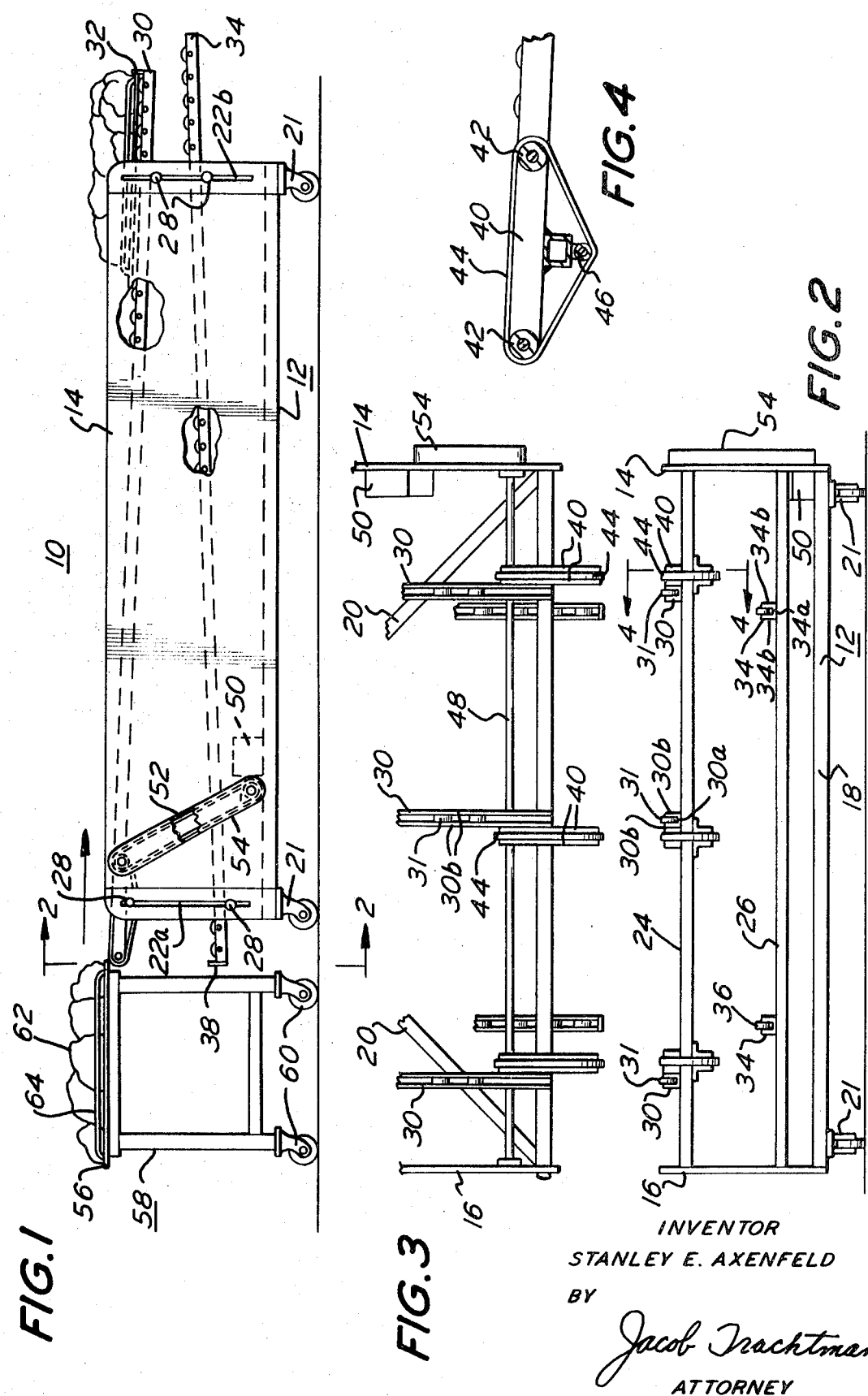
INVENTOR
STANLEY E. AXENFELD
BY
Jacob Trachtman
ATTORNEY

LAUNDRY CONVEYOR

The present invention relates to a laundry conveyor, and more particularly to a conveyor for transferring pallets containing laundry from one location to another.

In a laundry it is necessary to transfer wet or damp pieces of laundry from one location to another, such as from the washer to a dryer or ironer. In order to prevent the pieces of laundry from getting dirty, and to transfer a number of pieces of laundry at one time, it is desirable to use a pallet or the like to make the transfer. Since large pieces of laundry, such as sheets, are relatively heavy, particularly when wet, it is desirable to have a conveyor for transferring the pallets containing the pieces of laundry.

It is therefore an object of the present invention to provide a novel conveyor for transferring laundry pallets from one location to another.

It is another object of the present invention to provide a conveyor for transferring laundry pallets from one location to another and for returning the empty pallets to the original location.

It is still another object of the present invention to provide a conveyor for transferring laundry pallets from one location to another and for returning the empty pallets to the original location which takes up a minimum amount of space.

It is a further object of the present invention to provide a conveyor for transferring laundry pallets from one location to another which is portable so as to be easily moved to a desired position in a laundry.

These objects are achieved by a conveyor which includes a supporting frame having a pair of upright sides and supporting bars extending between the ends of the side walls. Two sets of horizontally extending guide rails are supported on the supporting bars with one set of the guide rails being vertically below the other set. The upper set of guide rails is vertically higher at one end of the frame that at the other end of the frame so that a pallet containing laundry will slide down the upper set of guide rails from the one end of the frame to the other end of the frame. A driven belt means is provided at the one end of the frame to help feed a loaded pallet to the higher end of the upper guide rails. The lower set of guide rails is vertically higher at the other end of the frame than at the one end of the frame so that empty pallets will slide down the lower set of guide rails back to the one end of the frame.

For the purpose of illustrating the invention there is shown in the drawings a form which is presently preferred; it being understood, however, that this invention is not limited to the precise arrangements and instrumentalities shown.

FIG. 1 is a side view of the conveyor of the present invention.

FIG. 2 is an end view of the conveyor taken along line 2—2 of FIG. 1.

FIG. 3 is a top view of one end of the conveyor.

FIG. 4 is a sectional view taken along line 4—4 of FIG. 2.

Referring to the drawings, the conveyor 10 of the present invention comprises a supporting frame 12 which, as shown in FIG. 2, includes a pair of spaced, parallel, upright side walls 14 and 16 connected together at their ends by end rails 18. The end rails 18 extend between the bottom edges of the side walls 14 and 16. A pair of brace rails 20 extend diagonally between and are secured to the corners of the frame 12 at the bottom edges of the side walls. As shown in FIG. 1, the side wall 14 has a pair of elongated, vertically extending slots 22a and 22b therein at the ends thereof. The side wall 16 has a corresponding pair of slots therein. The frame 12 is mounted on coasters 21 which are at each corner of the frame.

As shown in FIG. 2, a pair of vertically spaced supporting rods 24 and 26 extend between the side walls 14 and 16 at one end of the side walls. Headed bolts 28 extend through the slots 22a in the side walls 14 and 16 and are threaded into the ends of the supporting rods 24 and 26 to secure the supporting rods to the side walls. A similar pair of supporting rods extend between the side walls 14 and 16 at the other end of the side walls, and are secured to the side walls by bolts 28 which extend through the slots 22b and are threaded into the supporting rails. The vertical position of the supporting rods can be adjusted by loosening the bolts, moving the supporting rods vertically along the side walls, and then re-tightening the bolts.

Three spaced, parallel guide rails 30 extend across and are secured to the upper supporting rods 24. At one end of the frame 12, the end of each of the guide rails 30 is positioned at its adjacent supporting rod 24, whereas at the other end of the frame, the guide rails project beyond the other supporting rod 24. As shown in FIG. 2, each of the guide rails 30 is a U-shaped channel having its base 30a seated on the supporting rods, and its arms 30b extending upwardly. A plurality of cylindrical rollers 31 are rotatably mounted between the arms 30b of each of the guide rails 30 in spaced relation along the entire length of the guide rail. The supporting rod 24 at the one end of the frame 12 is positioned vertically above the other supporting rod 24. Thus, the guide rails 30 are angled downwardly from the one end of the frame 12 to the other end. A stop plate 32 is secured to the lower end of each guide rail 30 and projects above the arms 30b of the guide rail.

A pair of spaced, parallel guide rails 34 extend across and are secured to the lower supporting rods 26. The guide rails 34 are of a length so as to project beyond both the supporting rods 26 at each end of the frame 12. The guide rails 34, like the guide rails 30, are U-shaped channels having a base 34a secured to the supporting rods 26, and spaced arms 34b extending upwardly. A plurality of cylindrical rollers 36 are rotatably mounted between the arms 34b of each of the guide rails 34 and are spaced along the entire length of the guide rails. The supporting rod 26 at the one end of the frame 12 is vertically lower than the supporting rod at the other end of the frame. Thus, the guide rails 34 are angled downwardly from the other end of the frame 12 to the one end of the frame. A stop plate 38 is secured to the lower end of each of the guide rails 34 and projects above the arms of the guide rail.

At the one end of the frame 12 a separate pair of spaced, parallel, narrow arms 40 extend over and are secured to the upper supporting rod 24 along side of each of the guide rails 30. As shown in FIG. 4, a separate pair of pulleys 42 are mounted between each pair of arms 40 with each pulley being at an end of the arms. A separate continuous conveyor belt 44 extends around each pair of pulleys 42. Each belt 44 also extends over a pulley 46 mounted on the bottom of the upper supporting rod 24. A drive shaft 48 extends between and is rotatably supported on the side walls 14 and 16. The drive shaft 48 extends through one pulley 42 of each pair so as to rotate the belts 44. A motor 50 is mounted on the side wall 14. The motor drives a drive belt 52 which extends through a well 54 in the side wall 14 to drive the drive shaft 48.

In the use of the conveyor 10, a laundry pallet 56 is placed on a table 58 (See FIG. 1) which is mounted on castors 60. The pieces 62 of wet or damp laundry are piled on the pallet 56. The table 58 is rolled up to the one end of the conveyor 10 with the edge of the pallet 56 extending along the one end of the conveyor. The edge of the pallet 56 is lifted by handles 64 at the ends of the pallet and placed on the moving conveyor belts 44. The belts 44 carry the loaded pallet 56 onto the upper guide rails 30. The pallet 56 then slides down the guide rails 30 on the rollers 31 until the edge of the pallet engages the stop plate 32 at the other end of the guide rails. The pieces of laundry 62 are then removed from the pallet 56 to undergo the next laundry operation, such as drying or ironing. When the pallet 56 is empty, it is lifted from the upper guide rails 30 by the handles 64 and placed on the lower guide rails 34. The empty pallet 56 then slides down the lower guide rails 34 on the rollers 36 until the pallet engages the stop plate 38 at the lower end of the guide rails. The empty pallet 56 can then be placed back on the table 56 to be reloaded with laundry.

By using a plurality of the pallets, a second pallet can be loaded and slid down the upper guide rails 30 immediately after the first pallet. If the first pallet is still be unloaded when the second pallet reaches the lower end of the upper guide rails 30, it will be stopped by the first pallet. When the first pallet is emptied and returned on the lower guide rails 34, the second pallet will then slide down the guide rails 30 to the stop plate 32 where it is unloaded. Therefore, it is not necessary to wait until a pallet is unloaded before placing additional loaded pallets on the conveyor 10. Thus, the conveyor 10 can be placed between two operating stations in a laundry to permit ease of transferring large quantities of the pieces of laundry from one station to another. Since the conveyor 10 is on castors, it can be easily moved into position between any two operating stations. When the use of the conveyor 10 is not required it can be rolled out of the way to a storage location.

The present invention may be embodied in other specific forms without departing from the spirit or essential attributes thereof and, accordingly, reference should be made to the appended claims, rather than to the foregoing specification as indicating the scope of the invention.

What is claimed is:

1. A conveyor comprising a frame, two sets of guide rails mounted on said frame and extending from one end of the frame to the other end of the frame, one set of guide rails being vertically above the other set of guide rails, the upper set of guide rails extending downwardly from one end of the frame to the other end and the lower set of guide rails extending downwardly from the other end of the frame to the one end, driven conveyor belt means mounted on the frame adjacent the higher end of the upper guide rails, the frame being rectangular and comprising a pair of upright side walls connected in spaced parallel relation at their ends by end rails which extend between and are connected to the bottom edges of the side walls, a separate pair of supporting rods extending between and secured to the side walls at each end of the side walls, one supporting rod of each pair being vertically above the other supporting rod of the pair, the upper set of guide rails being mounted on the upper supporting rod of each pair and the lower set of guide rails being mounted on the lower supporting rod of each pair, each of the side walls having a separate, narrow, vertically extending slot therethrough adjacent each end thereof, headed bolts extending through said slots and threaded into the supporting rods to secure the supporting rods to the side walls but permitting the positioning of the supporting rods to be adjusted vertically, each of the guide rails being channel shaped having a base mounted on the supporting rods and a pair of spaced arms extending upwardly from the base, a plurality of cylindrical rollers rotatably mounted between the arms of each of the guide rails along the entire length of the guide rails, and a separate stop plate secured to the lower end of each of the guide rails and extending above the ends of the arms of the guide rail.

2. A conveyor in accordance with claim 1 in which the frame is mounted on coasters to permit ease of moving the conveyor to a desired position for use.

3. A conveyor in accordance with claim 1 in which the conveyor belt means includes a separate pair of spaced pulleys mounted adjacent each of the guide rails of the upper set of guide rails at the higher end of the guide rail, and a separate continuous conveyor belt extending around each pair of pulleys with the conveyor belts being parallel to the guide rails.

4. A conveyor in accordance with claim 3 in which each pair of pulleys is mounted between a pair of spaced arms which extend over and are secured to the upper supporting rod at the one end of the conveyor.

5. A conveyor in accordance with claim 4 including a drive shaft extending between and rotatably mounted on the side walls, said drive shaft extending through and being drivingly connected to one pulley of each set of pulleys, and means for rotating said drive shaft.

6. A conveyor in accordance with claim 5 in which the means for rotating the drive shaft includes a motor mounted on one of the side walls and a drive belt connecting the motor to the drive shaft.

7. A conveyor comprising a frame, two sets of guide rails mounted on said frame and extending from one end of the frame to the other end of the frame, one set of guide rails being vertically above the other set of guide rails, the upper set of guide rails extending downwardly from one end of the frame to the other end and the lower set of guide rails extending downwardly from the other end of the frame to the one end, a separate stop plate secured to the lower end of each of the guide rails and extending above the ends of their respective guide rails, driven conveyor belt means mounted on the frame proximate to and feeding the higher end of the upper guide rails, the frame being rectangular and comprising a pair of upright side walls connected in spaced parallel relation at their ends by end rails which extend between and are connected to the bottom edges of the side wall, and a separate pair of supporting rods extending between and secured to the side walls at each end of the side walls, one supporting rod of each pair being vertically above the other supporting rod of the pair, the upper set of guide rails being mounted on the upper supporting rod of each pair and the lower set of guide rails being mounted on the lower supporting rod of each pair, each of the side walls having a separate, narrow vertically extending slot therethrough adjacent each end thereof, headed bolts extending through said slots and being threaded into the supporting rods to secure the supporting rods to the side walls but permitting the position of the supporting rods to be adjusted vertically.

8. A conveyor in accordance with claim 7 in which each of the guide rails is channel shaped having a base mounted on the supporting rods and a pair of spaced arms extending upwardly from the base, and a plurality of cylindrical rollers are rotatably mounted between the arms of each of the guide rails along the entire length of the guide rails.

* * * * *